United States Patent
Cho et al.

(10) Patent No.: US 8,392,549 B2
(45) Date of Patent: Mar. 5, 2013

(54) APPARATUS AND METHOD FOR REGISTERING NODE AND SEARCHING FOR FLOATING INTERNET PROTOCOL ADDRESS USING DISTRIBUTED NETWORK

(75) Inventors: Sung Rae Cho, Seoul (KR); Hyun Ki Jung, Seoul (KR)

(73) Assignee: Chung-Ang University Industry—Academy Cooperation Foundation, Seoul (KR)

( * ) Notice: Subject to any disclaimer, the term of this patent is extended or adjusted under 35 U.S.C. 154(b) by 163 days.

(21) Appl. No.: 12/938,969

(22) Filed: Nov. 3, 2010

(65) Prior Publication Data

US 2011/0252129 A1    Oct. 13, 2011

(30) Foreign Application Priority Data

Apr. 12, 2010  (KR) .................. 10-2010-0033233

(51) Int. Cl.
*G06F 15/173* (2006.01)
(52) U.S. Cl. ........................................ 709/223
(58) Field of Classification Search ............ 709/223
See application file for complete search history.

(56) References Cited

U.S. PATENT DOCUMENTS

| | | | | |
|---|---|---|---|---|
| 5,430,727 | A * | 7/1995 | Callon | 370/401 |
| 6,141,325 | A * | 10/2000 | Gerstel | 370/238 |
| 6,434,627 | B1 * | 8/2002 | Millet et al. | 709/245 |
| 6,505,254 | B1 * | 1/2003 | Johnson et al. | 709/239 |
| 6,646,989 | B1 * | 11/2003 | Khotimsky et al. | 370/238 |
| 6,744,734 | B1 * | 6/2004 | Iliadis et al. | 370/238.1 |
| 6,766,371 | B1 * | 7/2004 | Hipp et al. | 709/225 |
| 6,865,613 | B1 * | 3/2005 | Millet et al. | 709/245 |
| 6,925,075 | B2 * | 8/2005 | Karagiannis | 370/338 |
| 7,146,431 | B2 * | 12/2006 | Hipp et al. | 709/238 |
| 7,159,035 | B2 * | 1/2007 | Garcia-Luna-Aceves et al. | 709/241 |
| 7,180,866 | B1 * | 2/2007 | Chartre et al. | 370/242 |
| 7,210,147 | B1 * | 4/2007 | Hipp et al. | 719/312 |
| 7,260,100 | B1 * | 8/2007 | Snodgrass | 370/400 |
| 7,280,557 | B1 * | 10/2007 | Biswas et al. | 370/465 |
| 7,359,360 | B2 * | 4/2008 | Ronneke | 370/338 |
| 7,401,160 | B2 * | 7/2008 | Johnson et al. | 709/238 |
| 7,441,045 | B2 * | 10/2008 | Skene et al. | 709/241 |
| 7,453,852 | B2 * | 11/2008 | Buddhikot et al. | 370/331 |
| 7,466,916 | B2 * | 12/2008 | Mitra et al. | 398/58 |

(Continued)

OTHER PUBLICATIONS

Kothari, A. et al., "Range Addressable Network: A P2P Cache Architecture for Data Ranges", Peer-To-Peer Computing, 2003. (P2P 2003). Proceedings of the Third International Conference on Sep. 1-3, 2003, Piscataway, NJ, USA, IEEE, Sep. 1, 2003, pp. 14-22.

(Continued)

*Primary Examiner* — Alicia Baturay
(74) *Attorney, Agent, or Firm* — Michael Best & Friedrich LLP

(57) ABSTRACT

A method of registering a new node in a network and a method of searching for a floating Internet Protocol (IP) address through a distributed network are provided. The method of searching for the floating IP address may include receiving, by a representative node of a head network ring, from an external node, a message comprising an Identification (ID) of a target node, determining whether the ID of the target node is registered in the head network ring, based on a ring information table, and transferring the message to a representative node of a child ring having an address range of the target node among child rings, when the ID of the target node is not registered in the head network ring.

12 Claims, 8 Drawing Sheets

U.S. PATENT DOCUMENTS

| | | | |
|---|---|---|---|
| 7,471,626 B2* | 12/2008 | Naghian et al. | 370/229 |
| 7,583,668 B1* | 9/2009 | Mayes et al. | 370/389 |
| 7,630,341 B2* | 12/2009 | Buddhikot et al. | 370/331 |
| 7,636,364 B2* | 12/2009 | Fotedar | 370/401 |
| 7,639,681 B2* | 12/2009 | Kelly et al. | 370/389 |
| 7,689,722 B1* | 3/2010 | Timms et al. | 709/249 |
| 7,768,943 B1* | 8/2010 | Troxel et al. | 370/254 |
| 7,826,372 B1* | 11/2010 | Mabe et al. | 370/237 |
| 7,830,878 B2* | 11/2010 | Furukawa | 370/389 |
| 7,869,359 B2* | 1/2011 | Kohler et al. | 370/231 |
| 7,899,066 B2* | 3/2011 | Tancevski | 370/404 |
| 8,004,971 B1* | 8/2011 | Szabo et al. | 370/230 |
| 8,024,478 B2* | 9/2011 | Patel | 709/238 |
| 8,144,595 B1* | 3/2012 | Troxel et al. | 370/238 |
| 8,144,721 B2* | 3/2012 | Wan et al. | 370/432 |
| 2001/0028488 A1* | 10/2001 | Kim et al. | 359/124 |
| 2002/0013856 A1* | 1/2002 | Garcia-Luna-Aceves et al. | 709/238 |
| 2002/0039357 A1* | 4/2002 | Lipasti et al. | 370/338 |
| 2002/0044549 A1* | 4/2002 | Johansson et al. | 370/386 |
| 2002/0163889 A1* | 11/2002 | Yemini et al. | 370/238 |
| 2003/0131044 A1 | 7/2003 | Nagendra et al. | |
| 2004/0203760 A1* | 10/2004 | Zhang | 455/433 |
| 2005/0013280 A1* | 1/2005 | Buddhikot et al. | 370/349 |
| 2006/0109802 A1* | 5/2006 | Zelig et al. | 370/258 |
| 2008/0298367 A1* | 12/2008 | Furukawa | 370/392 |
| 2009/0157889 A1* | 6/2009 | Treuhaft | 709/230 |
| 2010/0281093 A1* | 11/2010 | Poder et al. | 709/201 |
| 2010/0281174 A1* | 11/2010 | Poder et al. | 709/228 |
| 2010/0281508 A1* | 11/2010 | Poder et al. | 725/93 |
| 2010/0281534 A1* | 11/2010 | Poder et al. | 726/15 |
| 2010/0315954 A1* | 12/2010 | Singh et al. | 370/241 |
| 2011/0069650 A1* | 3/2011 | Singh et al. | 370/311 |
| 2011/0176555 A1* | 7/2011 | Poder et al. | 370/463 |
| 2011/0238864 A1* | 9/2011 | Purzynski | 709/242 |

OTHER PUBLICATIONS

Extended European Search Report for European Application No. 10014205.8 dated Nov. 3, 2011.

* cited by examiner

FIG. 2

| ID | IP address | Ring address range | IP addresses of representative nodes in child ring • parent ring | Information table of nodes in child ring • parent ring |
|----|------------|--------------------|------------------------------------------------------------------|--------------------------------------------------------|
| 120 | | 0~255 | IP addresses of nodes 48, 69, 150, and 195 | |
| 10 | | | | |
| 50 | | | | |
| 90 | | | | |

US 8,392,549 B2

APPARATUS AND METHOD FOR REGISTERING NODE AND SEARCHING FOR FLOATING INTERNET PROTOCOL ADDRESS USING DISTRIBUTED NETWORK

RELATED APPLICATIONS

This application claims priority to Korean Patent Application No. 10-2010-0033233, filed on Apr. 12, 2010, the entire contents of which are incorporated herein by reference.

FIELD OF THE INVENTION

The present invention relates to searching for a floating Internet Protocol (IP) address, and more particularly, to a method of registering a new node in a network and searching for a floating IP address using a distributed network.

BACKGROUND OF THE INVENTION

Most of nodes in an Internet network use floating Protocol (IP) addresses. Accordingly, to remotely control a desired node, or to receive various services provided via a node, there is a need to know a corresponding floating IP address.

To know a floating IP address, there is a need to search for a floating IP address. Generally, a floating IP address is searched for using a broadcasting scheme in an Internet-based service network. When the broadcasting scheme is used, a packet may be transferred to all nodes, to search for a floating IP address. Accordingly, a traffic load may be increased when all nodes using the Internet perform broadcasting.

Conventionally, to reduce the traffic load, a local server is used to search for a floating IP address of a desired node. Here, the local server may store IP information of service nodes, and desired nodes may query the local server of an IP address of a target node. Such a scheme may enable the searching operation to be rapidly performed, and may reduce traffic loads. As a capacity of data to be stored increases, a performance of a server is increased and a greater number of servers is used. However, it is inefficient to replace a server with a new server, or to increase the number of servers. This is because, in the future, a number of non-mobile nodes such as a desktop personal computer (PC), as well as, a number of mobile nodes such as a mobile phone, that are used as nodes in a service network, and a number of service addresses may be rapidly increased.

In a conventional distributed processing, broadcasting may be performed within a network and accordingly, data may be transmitted to all nodes, not a desired service. Additionally, in a non-distributed processing, an Internet address of a node of a service desired by a server needs to be stored, thereby increasing a data load and costs of facilities of the server.

Furthermore, when a distributed network having a hierarchical structure includes a mobile node having a relatively weak Internet connection, network status may be unstable.

Accordingly, there is a desire to continuously conduct a research on technologies that may construct a stable network, even when a distributed network having a hierarchical structure includes a mobile node.

SUMMARY OF THE INVENTION

An aspect of the present invention provides a method of searching for a floating Internet Protocol (IP) address through a peer-to-peer communication between representative nodes using a network ring and an address range, by forming a distributed network including a mobile node with an unstable Internet connection, rather than by using a broadcasting of the Internet.

Another aspect of the present invention provides a method of searching for a floating IP address that may provide a service to a local area or global area using a communication between representative nodes, and may receive a provided service using a desired service address by remotely controlling a correspondent node or by accessing a specific network.

According to an aspect of the present invention, there is provided a method of searching for a floating IP address, the method including receiving, by a representative node of a head network ring, a first message from an external node, the first message comprising an Identification (ID) of a target node, determining whether the ID of the target node is registered in the head network ring, based on a ring information table, and transferring the first message to a representative node of a child ring having an address range of the target node among child rings, when the ID of the target node is not registered in the head network ring.

According to another aspect of the present invention, there is provided a method of searching for a floating IP address, the method including determining, by an internal node, whether an ID of a target node is in an address range of a network ring to which the internal node belongs, determining, based on a ring information table, whether the ID of the target node is registered in the network ring, when the ID of the target node is determined to be in the address range of the network ring, transferring a message including the ID of the target node to a representative node of the network ring, when the ID of the target node is not registered in the network ring, determining, by the representative node, whether a child ring having an address range including the ID of the target node exists among child rings, and transferring the message to a representative node of a parent ring and a representative node of the child ring, when the child ring having the address range including the ID of the target node is determined to exist.

According to still another aspect of the present invention, there is provided a method of registering a service node, the method including requesting, by a new node, a directory server to transmit a service name of a service to be provided by the new node, and a virtual address of the new node, receiving the virtual address of the new node from the directory server, transferring a first message to a representative node of a predetermined service network and requesting a search for a parent representative node of the new node, the first message including the received virtual address of the new node, storing, by the parent representative node, the virtual address of the new node and an Internet address of the new node as child registration information, and transmitting a second message to the new node, the second message including a virtual address and an Internet address of the parent representative node, and storing, by the new node, information of the parent representative node, the information being included in the second message.

According to yet another aspect of the present invention, there is provided a method of registering a service node, the method including transmitting a first message to a representative node of a predetermined service network, the first message including a virtual address of an existing service network, requesting the representative node of the predetermined service network to search for a representative node of the existing service network, and registering a target node through the representative node of the existing service network, the representative node of the existing service network being found as a result of the search.

According to a further another aspect of the present invention, there is provided an apparatus for searching for a floating IP address, the apparatus including a receiving unit to receive a first message from an external node, the first message including an ID of a target node, a search processing unit to determine whether the ID of the target node is registered in a head network ring, based on a ring information table, a message processing unit to generate a second message, when the ID of the target node is not registered in the head network ring, the second message including a search failure message that may be received from a head network ring and a leaf ring in addition to the ID of the target node, and a transmitting unit to transmit the second message to a representative node of a child ring having an address range of the target node among child rings.

According to a further another aspect of the present invention, there is provided an apparatus for searching for a floating IP address, the apparatus including a receiving unit to receive a first message, the first message including an ID of a target node, a search processing unit to determine whether the ID of the target node is in an address range of a network ring to which an internal node belongs, to determine, based on a ring information table, whether the ID of the target node is registered in the network ring when the ID of the target node is in the address range of the network ring, to transfer the first message to a representative node of the network ring when the ID of the target node is not registered in the network ring, and to determine, by the representative node, whether a child ring having an address range including the ID of the target node exists among child rings, a message processing unit to generate a second message, when the child ring having the address range including the ID of the target node exists, the second message including a search failure message that may be received from a head network ring and a leaf ring in addition to the ID of the target node, and a transmitting unit to transmit the second message to a representative node of a parent ring and a representative node of the child ring having the address range.

According to still another aspect of the present invention, there is provided a network system for searching for a floating IP address, the network system including a representative node to perform signaling with either a representative node of a parent ring or a representative node of a child ring, for searching for a floating IP address, and a member node to request the representative node to search for a floating IP address of a predetermined node, when a search for the floating IP address of the predetermined node is required.

EFFECT

According to embodiments of the present invention, it is possible to search for a floating Internet Protocol (IP) address through a peer-to-peer communication between representative nodes using a network ring and an address range, by forming a distributed network including a mobile node with an unstable Internet connection, rather than by using a broadcasting of the Internet.

Additionally, according to embodiments of the present invention, it is possible to search for a floating IP address, so as to provide a service to a local area or global area using a communication between representative nodes, and to receive a provided service using a desired service address by remotely controlling a correspondent node or by accessing a specific network.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 2 is a diagram illustrating an example of a ring information table;

DETAILED DESCRIPTION

Figure 1:
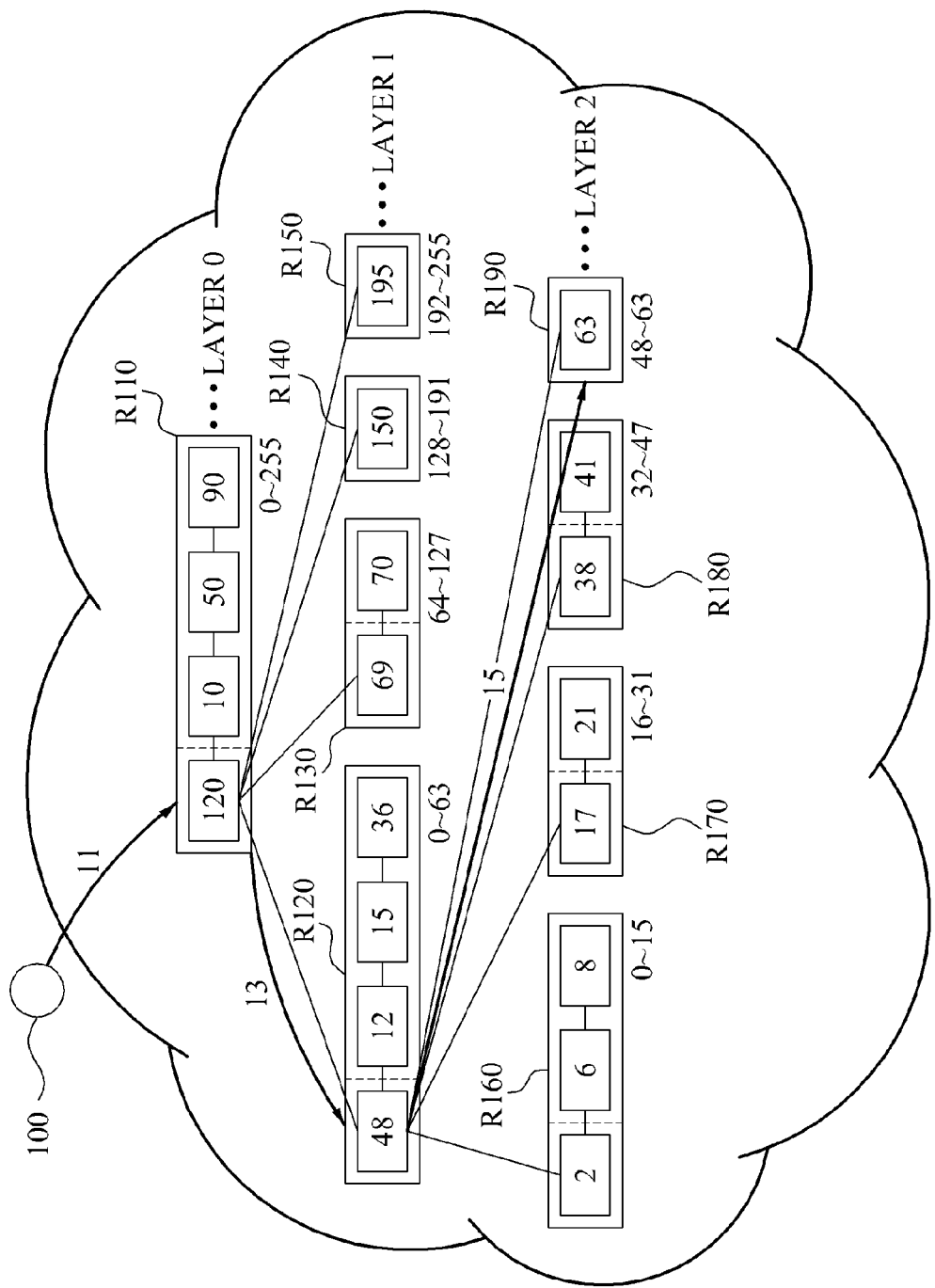
FIG. 1 is a diagram illustrating an example where a node in an external service network searches for a floating Internet Protocol (IP) address of a node in another service network, in a method of searching for a floating IP address according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating an example where a node in an external service network searches for a floating Internet Protocol (IP) address of a node in another service network, in a method of searching for a floating IP address according to an embodiment of the present invention.

FIG. 1 illustrates a connection structure of service networks to explain a method of searching for a floating IP address of a target node that an external node desires to search for. The external node refers to a node belonging to a service network that provides different services. The target node refers to a node belonging to a service network from which the external node desires to search for.

In the method of searching for a floating IP address, a number of branches may be 'N', and a number of bits of an address may be '$2^N$'. In other words, a searchable tree may be an N-ary tree, and addresses may be in a range of '0' to '$2^N$-1'. The connection structure of FIG. 1 may have quad search tree, that is, searching may be performed for four network rings, and an address may have 8 bits, that is, an address range may be set from '0' to '$2^8$-1'.

In a tree, at least one node may be gathered to form a ring shape, rather than nodes used as a parent node or child nodes being individually provided. Accordingly, groups R110 to R190 formed by grouping the at least one node may be referred to as network rings. The grouping of at least one node in the network rings may enable an increase in stability of construction of a hierarchical distributed network including a node, such as a mobile device having a relatively weak Internet connection.

Each of the network rings R110 to R190 may store ring information required to maintain each of the network rings R110 to R190, in the form of a table. Nodes of each of the network rings R110 to R190 may update an information table, may transmit the updated information table, and may share the latest information of the network rings R110 to R190. Each of the nodes may include an information table of a network ring to which a node belongs, an information table of all nodes of a parent ring, and an information table of all nodes of a child ring. A number of nodes forming each network ring may be determined based on a purpose of network construction, and may not be the same for each network ring. Additionally, the number of nodes in each network ring may be determined based on a performance of nodes of each network ring. Accordingly, a single node in a network ring may be replaced with another node, even when the single node loses its function.

For example, ring information for the network ring R110 of FIG. 1 may be stored and shared. In FIG. 1, numerals 120, 10, 50, and 90 given to nodes in the network ring R110 may indicate Identifications (IDs) of the nodes used as key values of a search structure. Each of the IDs may include, for example, a sum of a national number and a mobile phone number.

A representative node of each network ring may be placed in the leftmost position of each network ring. For example, in the network ring R110, the numeral 120 indicates an ID of a representative node. Each representative node may manage nodes in each network ring, and may receive and transmit messages from and to a representative node of a parent ring or to a representative node of a child ring. The parent ring and the child ring will be described below. While a representative node of each of the network rings R110 to R190 is placed in the leftmost position of each of the network rings R110 to R190 as shown in FIG. 1, the position of the representative node may be changed based on a hardware performance of a directory server or of a node, for example, a capacity, a speed, and the like.

An information table of the network ring R110 may indicate that the ID of the representative node of the network ring R110 is '120'. Additionally, the information table may store IDs and IP addresses of the nodes belonging to the network ring R110, and may store an address range of '0' to '255' including a maximum value and a minimum value of an ID of a node that may be included in the network ring R110.

A maximum value and a minimum value of an ID that may be contained in a head network ring (namely, a layer 0 of FIG. 1) may represent start value and end value of addresses. The head network ring refers to a network ring having a lowest layer value, for example a layer 0. When other network rings include a K-th child ring in an N-ary search tree of a layer M, an ID that may be included in the K-th child ring may have a minimum value obtained by calculating '(a minimum value of a parent ring+((a maximum value of the parent ring−the minimum value of the parent ring+1)/N)*(K−1))', and a maximum value obtained by calculating '(the minimum value of the parent ring+((the maximum value of the parent ring−the minimum value of the parent ring+1)/N)*K−1)'. Here, each of M and K may be a natural number greater than 1n.

Among network rings, a network ring having a relatively low layer value is referred to as a parent ring, and a network ring having a relatively high layer value is referred to as a child ring. For example, the network ring R110 may be a parent ring of the network ring R120, and the network ring R120 may be a parent ring of the network ring R160. Additionally, the information table of the network ring R110 may include IP addresses of representative nodes of the network rings R120 to R150 that are child rings of the network ring R110. Here, IDs of the representative nodes of the network rings R120 to R150 may be '48', '69', '150', and '195', respectively.

Hereinafter, a method by which an external node 100 searches for a floating IP address of a target node with an ID of '63' will be described.

The method of searching for a floating IP address according to the embodiment of the present invention may include receiving, by a representative node of a head network ring, a message including an ID of a target node from an external node.

For example, in operation 11 of FIG. 1, the representative node 120 of the head network ring R110 may receive, from the external node 100, a message including the ID of the target node, namely a numeral '63'. Here, the external node 100 may search for a service of the target node from a directory server, and may receive a virtual address of a service network to which the target node belongs. The external node 100 may transfer a message to a representative node of a service network to which the target node 63 belongs, through a search process using the received virtual address. A representative node of the service network to which the target node belongs may typically refer to a representative node of a head network ring.

Additionally, the method may include determining whether the ID of the target node is registered in the head network ring, based on a ring information table of the head network ring. The representative node 120 may verify that the ID of the target node is not stored in the ring information table of the network ring R110 that includes the IDs of '120', '10', '50', '90'.

Furthermore, the method may include transferring the message including the ID of the target node to a representative node of a child ring having an address range of the target node among child rings, when the ID of the target node is not registered in the head network ring.

Since the target node with the ID of '63' does not exist in the network ring R110, the representative node 120 may transfer a message including the ID of the target node and an IP address of the external node 100, to a representative node of the network ring R120 having an address range of '0' to '63' of the target node among the network rings R120, R130, R140, and R150 that are child rings of the network ring R110, in operation 13. Here, the representative node of the network ring R120 may have an ID of '48'. The message including the ID of the target node may include a message stating an IP address of the external node and a search for an IP address of the target node.

The network ring R120 may verify that the ID of the target node does not exist, based on a ring information table including IDs of '48', '12', '15', and '36'. The network ring R120 may transfer a message including the ID of the target node and the IP address of the external node 100, to a representative node of the network ring R190 having an address range of '48' to '63' of the target node among network rings R160, R170, R180, and R190 that are child rings of the network ring R120, in operation 15. Here, the representative node of the network ring R190 may have an ID of '63'.

In other words, when the message including the ID of the target node is received to a representative node of a network ring, the representative node may determine whether the ID of the target node exists in the network ring. When the ID of the target node does not exist, the representative node may continue to transfer the message stating the IP address of the external node and the search for the IP address of the target node, to a representative node of a child ring having an address range of the target node among child rings, until reach the last layer.

The representative node with the ID of '63' in the network ring R190 may verify that the ID of the target node exists, based on the ring information table, and may transmit an IP address of the representative node with the ID of '63' to the IP address of the external node 100 that is included in the message.

In addition, the method may include receiving, by a node of a predetermined network ring, instead of the head network ring, a message including the ID of the target node from the external node. In other words, the external node may start the search process via another node, instead of the representative node of the service network that the external node desires to search for via the directory server. For example, when the IP address of the target node found as a result of the search through the head network ring is already stored in the directory server, the external node may start the search process in the target node that is already found, to search for a floating IP address of another node in the same service network.

When the message is received, the node of the predetermined network ring may determine whether the ID of the target node is included in an address range of the predetermined network ring. When the ID of the target node is not included in the address range of the predetermined network ring, the node of the predetermined network ring may transfer, to a representative node of a parent ring via a representative node of the predetermined network, the message stating the IP address of the external node and the search for the IP address of the target node. Conversely, when the ID of the target node is included in the address range of the predetermined network ring, the node of the predetermined network ring may determine whether the ID of the target node is registered in the predetermined network ring, based on a ring information table of the predetermined network ring.

When the ID of the target node is registered, the node of the predetermined network ring may transfer information including the ID and IP address of the target node to the IP address of the external node. Conversely, when the ID of the target node is not registered, the node of the predetermined network ring may transfer the message stating the IP address of the external node and the search for the IP address of the target node, to a representative node of a parent ring of the predetermined network ring and to a representative node of a child ring having an address range of the target node, via the representative node of the predetermined network.

When the message is received, the representative node of the parent ring may determine whether the ID of the target node is included in an address range of the parent ring, and whether the ID of the target node is registered in the parent ring, through the above process. When the ID of the target node is not included in the address range of the parent ring, or is not registered in the parent ring, the message stating the IP address of the external node and the search for the IP address of the target node may be transferred to a parent ring of the parent ring. Additionally, when the ID of the target node is not included in the address range of the predetermined network ring, the message stating the IP address of the external node and the search for the IP address of the target node may be transferred to a representative node of a child ring having the address range of the target node among child rings of the parent ring.

The representative node of the child ring may determine whether the ID of the target node is registered in the child ring, through the above process. When the ID of the target node is not registered in the child ring, the message stating the IP address of the external node and the search for the IP address of the target node may be transferred to a representative node of a child ring having the address range of the target node among its child rings.

As described above, a node starting the search process may transfer a search message to a parent ring and a child ring having an address range of a target node, because searching of the parent ring may be prevented from being overlapped with searching of the child ring during the search process.

In the method, when a source node receives a search failure message from a head network ring and a leaf ring, the searching of the IP address of the target node may be determined as a failure. Here, the source node refers to a node that desires to search for the IP address of the target node, and the leaf ring refers to a ring that does not have a child ring.

When the head network ring transmits the search failure message to the source node, it is determined that the ID of the target node is not registered in the head network ring. However, the search process may not be terminated immediately after the search failure message is received. Specifically, when a child ring including a representative node transferring a search message is identical to a child ring having the address range including the ID of the target node, the search process may be terminated. When the child ring including the representative node transferring the search message is different from the child ring having the address range including the ID of the target node, the search message may be transferred to a representative node of another child ring including the ID of the target node. When the leaf ring transmits the search failure message to the source node, it is determined that the ID of the target node is not registered in the leaf ring.

Additionally, when the source node receives, from the head network ring, a failure message stating that the ID of the target node is not registered, and a message stating that there is no child ring having the address range including the ID of the target node, the searching of the IP address of the target node may be determined as a failure.

In the method, a distributed processing between service networks and the search tree may be used and accordingly, the directory server may store only a name and virtual address of a service. Additionally, the directory server may store an Internet address of a representative node of a lately registered service, in order to prevent a load from occurring in a root node of the tree. Each node of a service network may store Internet addresses and service addresses of nodes in a parent ring and child rings that are connected to the node. In other words, when searching for a service network, a communication between nodes may be performed, without using the directory server. Accordingly, a little load may occur in the directory server even when virtual addresses are assigned to a greater number of services.

FIG. 2 is a diagram illustrating an example of a ring information table.

A node of each network ring may use a ring information table, to determine whether an ID of a target node exists.

Each ring information table may store an ID of a representative node of each network ring, IDs of nodes of each network ring, an IP address of each node, an address range including a maximum value and minimum value of an ID of a node that may be included in a network ring, and an information table of all nodes in a parent ring or child rings. Accordingly, the ring information table may store information that enables nodes other than a representative node to be used instead of the representative node, even when the representative node does not operate.

Referring to FIG. 2, the ring information table of the network ring R110 of FIG. 1 may indicate that the ID of the representative node of the network ring R110 is '120'. Additionally, the ring information table may store IDs and IP addresses of the nodes belonging to the network ring R110, and may store an address range of '0' to '255' including a maximum value and a minimum value of an ID of a node that may be included in the network ring R110. The ring information table may also store IP addresses of the representative nodes with IDs of '48', '69', '150', and '195' that are included in the network rings R120 to R150. Information regarding each node of a parent ring or child rings may also be stored in the ring information table.

Figure 3:
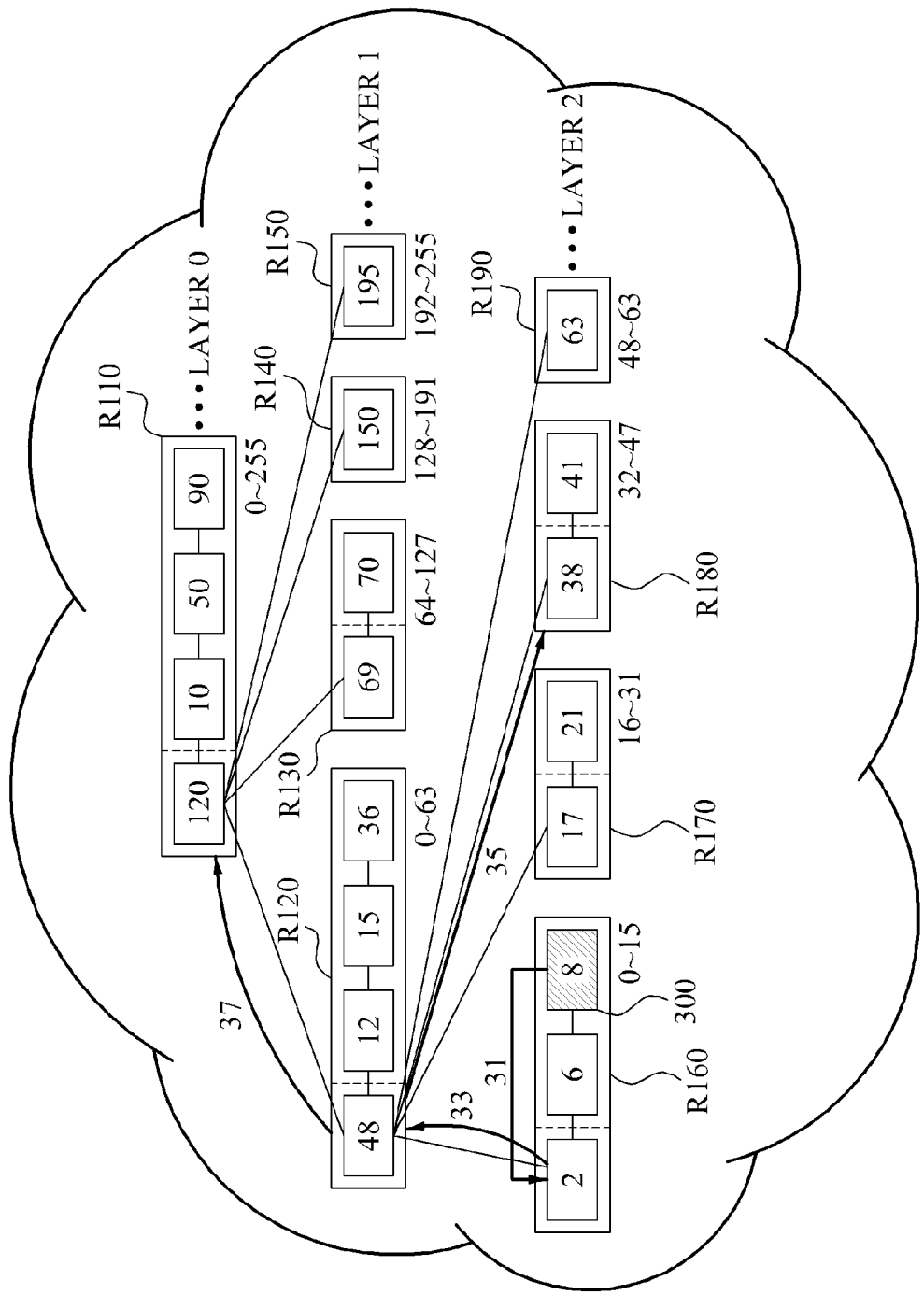
FIG. 3 is a diagram illustrating an example where a node in an internal service network searches for a floating IP address of another node in the internal service network, in a method of searching for a floating IP address according to an embodiment of the present invention.

FIG. 3 is a diagram illustrating an example where a node in an internal service network searches for a floating IP address of another node in the internal service network, in a method of searching for a floating IP address according to an embodiment of the present invention.

FIG. 3 illustrates a connection structure of a service network to explain a method of searching for a floating IP address of a target node that an internal node desires to search for. The connection structure of the service network of FIG. 3 may be identical to the connection structure of FIG. 1. However, in the service network of FIG. 3, the internal node, instead of the external node of FIG. 1, may search for the floating IP address of the target node. Here, the internal node refers to one of nodes belonging to the same service network. The target node refers to a node belonging to a service network from which the internal node desires to search for.

The method of searching for a floating IP address according to the embodiment of the present invention may include determining, by a internal node, whether an ID of the target node is included in an address range of a network ring to which the internal node belongs.

For example, an internal node 300 may determine, based on a ring information table, whether a target node with an ID of '41' is included in an address range of '0' to '15' of a network ring R160 to which the internal node 300 belongs. Since the address range is set from '0' to '15', it is determined that the target node with the ID of '41' is not included in the network ring R160.

Conversely, when the target node with the ID of '41' is included in the network ring R160, the internal node 300 may determine whether the ID of the target node is registered in the network ring 160, based on the ring information table.

Additionally, the method may include transferring a message including the ID of the target node to a representative node of the network ring, when the ID of the target node is not included in the address range of the network ring, or is not registered in the network ring. Here, the message including the ID of the target node may include a message stating an IP address of the internal node and the search for an IP address of the target node. Since the ID of '41' is not included in the address range of the network ring R160, the internal node 300 may transfer, to a representative node with an ID of '2', a message including the ID of '41', in operation 31.

Furthermore, in the method, the representative node receiving the message including the ID of the target node may transfer a search message to a parent ring. Subsequently, the representative node may determine whether a child ring having an address range including the ID of the target node exists in child rings, when the ID of the target node is included in the address range, but not registered in the network ring.

Since the ID of the target node is not included in the address range of the network ring R160, the representative node with the ID of '2' may perform the search process only in the network ring R120 that is a parent ring of the network ring R160. An address range of '0' to '63' in the network ring R120 includes the ID of '41' and accordingly, the search process may continue to be performed in the network ring R120. In another example, when a representative node with an ID of '48' in the network ring R120 searches for the ID of '41', the network ring R110 as a parent ring, and a network ring R180 having an address range of '32' to '47' among the network rings R160, R170, R180, and R190 that are child rings of the network ring R120 may be determined to exist.

Additionally, the method may include transferring the message including the ID of the target node to a representative node of a parent ring or to a representative node of a child ring having the address range including the ID of the target node, when the child ring having the address range including the ID of the target node exists. In operation 33 of FIG. 3, the representative node with the ID of '2' may transfer the message including the ID of the target node to the representative node with the ID of '48' in the network ring R120.

The representative node with the ID of '48' may determine, based on the ring information table, that the ID of '41' is not registered in the network ring R120. When the ID of the target node is not registered, the representative node receiving the search message may examine which network ring includes the representative node transferring the search message, based on the ring information table. When the representative node transferring the search message is included in a parent ring, the search message may be transferred to the representative node of the child ring having the address range including the ID of the target node. When the representative node transferring the search message is included in a child ring, the search message may be transferred to the parent ring. Here, when the ID of the target node is not included in the address range of the child ring, the search message may be transferred to a representative node of another child ring including the ID of the target node.

The representative node with the ID of '2' transferring the search message is included in the network ring R160 and the network ring R160 is the child ring of the network ring R120 and accordingly, the representative node with the ID of '48' may transfer the search message to the representative node with the ID of '120' of the network ring R110 in operation 37. Since the ID of '41' is not included in the address range of '0' to '15' of the network ring R160 to which the representative node with the ID of '2' belongs, the message including the ID of '41' may be transferred to a representative node with an ID of '38' of the network ring R180 having the address range of the target node in operation 35. As described above, the message including the ID of the target node may include the message stating the IP address of the internal node and the search for the IP address of the target node.

The representative node with the ID of '38' of the network ring R180 may verify that the ID of '41' is included in the network ring R180, based on a ring information table of the network ring R180, and may transfer the IP address of '41' to the IP address of the internal node 300. Here, the IP address of '41' may be stored in the ring information table or the network ring R180.

Furthermore, in the method, a predetermined node of a network ring, instead of a representative node of the network ring, may directly perform signaling with a representative node of a parent ring or a representative node of a child ring, and with a representative node of another network ring having an address range including the ID of the target node.

In other words, since a source node already knows an IP address of the representative node of the parent ring, the source node may directly transfer the message including the ID of the target node to the representative node of the parent ring. In addition to the ID of the target node, the message may include an ID and IP address of the source node, information regarding whether a network ring to which the source node belongs is a parent ring or a child ring in a relationship with another network ring that receives a message from the source node, and information regarding an order of the network ring among child rings when the network ring is a child ring. When the message is received from the source node, the representative node of the parent ring may determine whether the ID of the target node is included in the address range of the parent ring, and whether the ID of the target node is registered in the parent ring. When the ID of the target node is not registered in the parent ring, the representative node of the parent ring may transfer, to the source node, a message that includes information regarding a first network ring (for example, a parent ring, or a child ring) that has the address range of the ID of the target node, and information regarding whether the network ring to which the source node belongs is a parent ring or a child ring in a relationship with the first network ring, and information regarding an order of the network ring among child rings when the network ring is a child ring. Here, the information regarding the first network ring may include, for example, an ID and an IP address of a representative node of the first network ring, and the like.

The source node may directly transfer a search message to the representative node of the first network ring, based on the information of the received message. When the search message is received, the representative node of the first network ring may determine whether the ID of the target node is registered in the first network ring. When the ID of the target node is registered in the first network ring, the representative node of the first network ring may transfer the IP address of the target node to an IP address of the source node. Conversely, when the ID of the target node is not registered in the first network ring, the representative node of the first network ring may transfer, to the source node, a message that includes information regarding a second network ring (for example, a parent ring, or a child ring) that has the address range of the ID of the target node, and information regarding whether the first network ring is a parent ring or a child ring in a relationship with the second network ring, and information regarding an order of the first network ring among child rings when the first network ring is a child ring.

The above process may be repeated until the ID of the target node is found as a result of the searching, or until the source node receives a search failure message from a head network ring and a leaf ring. The source node may directly perform signaling with the representative node of the network ring having the ID of the target node. Additionally, to exclude a network ring that already performs the signaling, the source node may receive information regarding whether a network ring transferring the search message is a parent ring or child ring in a relationship with a network ring receiving the search message, and information regarding an order of the network ring transferring the search message among child rings when the network ring transferring the search message is a child ring. The information in the message may be stored in each ring information table.

Hereinafter, an example where the source node has an ID of '8', and the target node has an ID of '200' is described with reference to FIG. 3. Since the ID of the target node is not included in an address range of the network ring R160 to which the source node with the ID of '8' belongs, a search message may be transferred to the representative node with the ID of '48' in the network ring R120. Here, the search message may include the ID and an IP address of the source node, the ID of the target node, and information that the network ring R160 is the first child ring of the network ring R120. Additionally, since the ID of the target node is not included in an address range of the network ring R120, the representative node with the ID of '48' may transfer, to the source node, a message including information regarding the network ring R110 as a parent ring of the network ring R120, and information that the network ring R120 is the first child ring of the network ring R110. Here, the information regarding the network ring R110 may include, for example, an ID and an IP address of the representative node of the network ring R110, and the like.

Subsequently, the source node 8 may transfer a search message to the representative node with the ID of '120' in the network ring R110 that is a head network ring. Here, the search message may include the ID and the IP address of the source node, the ID of the target node, and information that the network ring R120 is the first child ring of the network ring R110. Since the ID of '200' is included in an address range of '0' to '255' of the network ring R110, the representative node with the ID of '120' may verify whether the ID of '200' is registered in the network ring R110, based on the ring information table. The ID of '200' is not registered in the network ring R110. The representative node with the ID of '120' may transfer a search failure message and a search message to the source node. Here, the search failure message may notify that the searching fails, because the ID of the target node is not registered in the network ring R110. Additionally, the search message may include information regarding a network ring R150 that has an address range including the ID of the target node, and information that the network ring R150 is a child ring of the network ring R110. Here, the information regarding the network ring R150 may include, for example, an ID and an IP address of a representative node with an ID of '195' in the network ring R150, and the like.

Additionally, the source node may transfer, to the representative node with the ID of '195' in the network ring R150, a search message including the ID and the IP address of the source node, the ID of '200', and information that the network ring R110 is a parent ring of the network ring R150. The representative node with the ID of '195' may verify that the target node is not registered in the network ring R150, based on a ring information table of the network ring R150. Since the network ring R150 is a leaf ring without having a child ring, the representative node with the ID of '195' may transfer a search failure message to the source node. The source node may receive the search failure message from the network ring R110 and the network ring R150, so that the search process may be terminated.

The source node may directly perform signaling with the representative nodes with the IDs of '48', '120', and '195', and may transmit information regarding a relationship between a representative node of a network ring acquiring information and a network ring that is to transfer a next search message, thereby preventing the search process from being overlapped.

Additionally, in the method, when a source node receives a search failure message from a head network ring and a leaf ring, the searching of the IP address of the target node may be determined as a failure. Here, the source node refers to a node that desires to search for the IP address of the target node, and the leaf ring refers to a ring that does not have a child ring.

When the head network ring transmits the search failure message to the source node, it is determined that the ID of the target node is not registered in the head network ring. However, the search process may not be terminated immediately after the search failure message is received. Specifically, when a child ring including a representative node transferring a search message is identical to a child ring having the address range including the ID of the target node, the search process may be terminated. When the child ring including the representative node transferring the search message is different from the child ring having the address range including the ID of the target node, the search message may be transferred to a representative node of another child ring including the ID of the target node. When the leaf ring transmits the search failure message to the source node, it is determined that the ID of the target node is not registered in the leaf ring.

In other words, the representative node with the ID of '120' in the network ring R110 may determine that the ID 41 of the target node is not registered in the network ring R110, based on the ring information table, and may transfer a search failure message to the internal node 300. Additionally, the network ring R120 including the representative node with the ID of '48' transferring the search message is identical to a child ring R120 having the address range including the ID 41 of the target node and accordingly, the search process through the head network ring R110 may be terminated. However, since the ID 41 of the target node is registered in the network ring R180 as a leaf ring, the internal node 300 may receive the IP address of the target node, instead of the search failure message, from the network ring R180. Thus, the search for the floating IP address of the target node may be completed.

Additionally, in the method, when the source node receives, from the head network ring, a failure message stating that the ID of the target node is not registered, and a message stating that there is no child ring having the address range including the ID of the target node, the searching of the IP address of the target node may be determined as a failure.

For example, it is assumed that the network ring R150, namely a fourth child ring of the head network ring R110, does not exist. In this example, when a source node with an ID of '2' searches for a floating IP address of a target node with an ID of '250', a search message may be transferred to the representative node with the ID of '120' in the head network ring R110 through the network ring R120 that is a child ring of the head network ring R110. The ID 250 of the target node is included in the address range of '0' to '255' of the head network ring R110, however, the representative node with the ID of '120' may verify that the ID of the target node is not registered in the head network ring R110, based on the ring information table. Additionally, since the ID of the target node is not registered in the head network ring R110, the representative node with the ID of '120' may transfer a search failure message to the source node with the ID of '2'. However, since the ID 250 of the target node is not included in an address range of '0' to '63' in the network ring R120 transferring the search message, the representative node with the ID of '120' may determine whether a child ring having the address range including the target node with the ID of '250' exists, based on the ring information table. Since the network ring R150 as the fourth child ring of the head network ring R110 does not exist, there is no child ring having the address range including the target node with the ID of '250'. Additionally, the head network ring R110 may transfer, to the source node, not only a search failure message notifying that the ID of the target node is not registered in the head network ring R110, but also a message notifying that the child ring including the target node with the ID of '250' does not exist among child rings. Therefore, the search process may be terminated.

Figure 4:
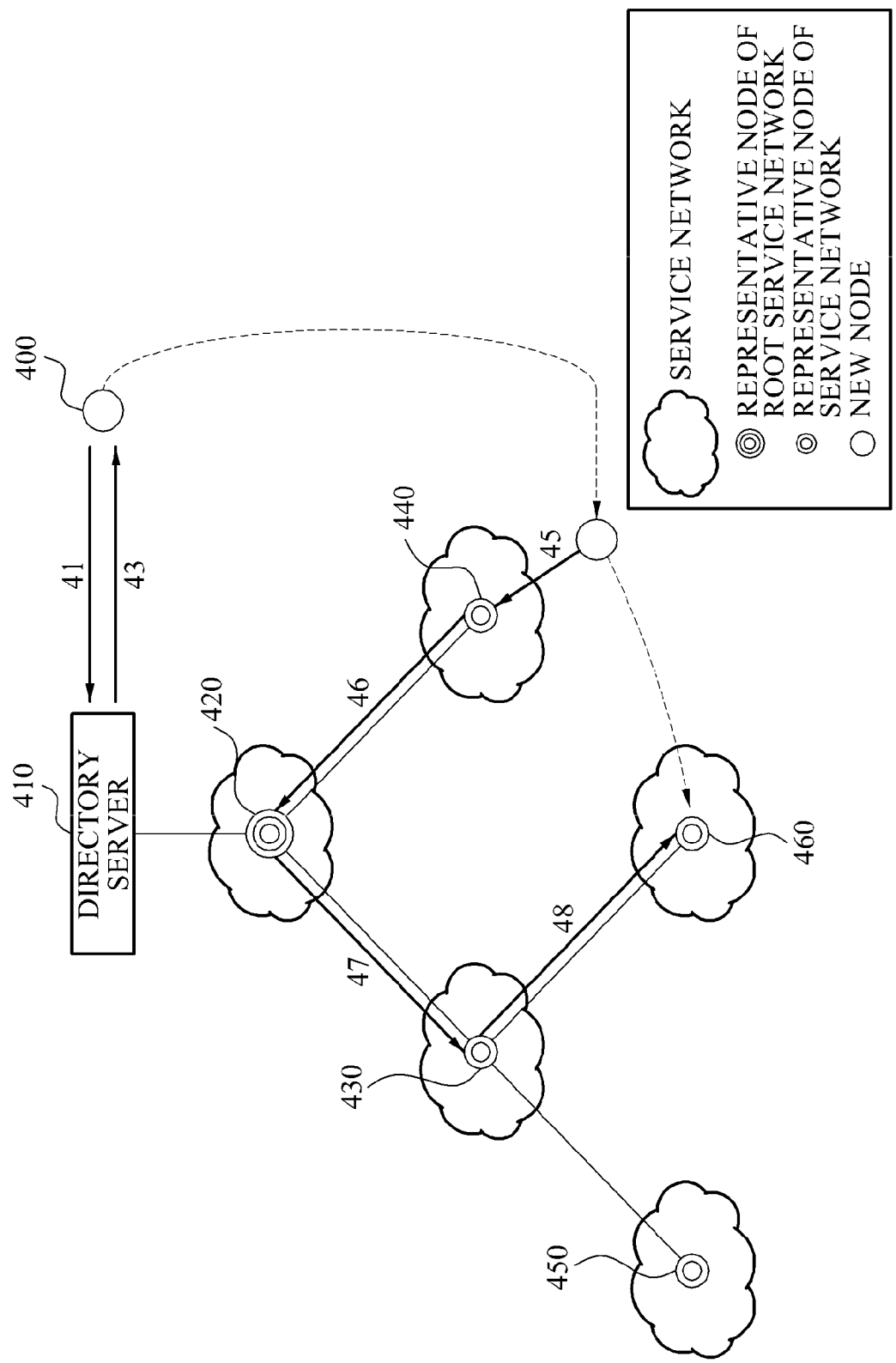
FIG. 4 is a diagram illustrating an example of registering a new service node in a method of registering a service node according to an embodiment of the present invention.

FIG. 4 is a diagram illustrating an example of registering a new service node, in a method of registering a service node according to an embodiment of the present invention.

FIG. 4 illustrates a connection structure of a distributed network. First, a directory server 410, representative nodes 420, 430, 440, 450, and 460 of service networks, and a new node 400 will be described, and then a registration of a new service network (namely, a new service node) will be described.

The new node 400 refers to a node that desires to register a new service network. The directory server 410 may manage a tree structure of the distributed network. The tree structure of the distributed network may be based on a general N-ary search tree.

The directory server 410 may store a service address and an Internet address of the representative node 420 of a root service network. Additionally, the directory server 410 may store a service address and an Internet address of each of the representative nodes 420, 430, 440, 450, and 460. The service address refers to a virtual address assigned by the directory server 410 to each of the representative nodes 420, 430, 440, 450, and 460 based on a predetermined reference. The root service network refers to a service network from which the tree structure of the distributed network starts. The representative nodes 420, 430, 440, 450, and 460 may be determined based on a definition of each corresponding service network. For example, a representative node of a head network ring may be a representative node of the entire service network.

In the method of FIG. 4, the directory server 410 does not require all operations for registering a new service node. In other words, a representative node of a predetermined service network may be used to register a new service node.

In FIG. 4, the new node 400 may transmit, to the directory server 410, a query including a name of a service to be provided by the new node 400. Specifically, the new node 400 may transmit the query, to determine whether information including a type and the name of the service to be provided by the new node 400, and the like is stored and registered in the directory server 410.

Additionally, the new node 400 may receive, from the directory server 410, a message in response to the query. Here, the message may include a service list, and an Internet address of the representative node 440 of a predetermined service network in a currently configured network. The new node 400 may receive a result obtained by determining whether a service network that the new node 400 desires to provide is registered in the directory server 410. The new node 400 may receive the Internet address of the representative node 440 from the directory server 410, and may start a search process to determine a position of the tree structure in which the service network is to be registered.

In operation 41, the new node 400 may request the directory server 410 to transmit the name of the service to be provided by the new node 400, and a virtual address of the new node 400. Since a service network to be provided by the new node 400 is not registered in the directory server 410, the new node 400 may request the name of the service, and the virtual address that is used to distinguish the service network from other service networks.

In operation 43, the new node 400 may receive the virtual address from the directory server 410.

In operation 45, the new node 400 may transfer a message including the received virtual address to the representative node 440, and may request a search for a parent representative node of the new node 400. Specifically, the new node 400 may request the representative node 440 to search for a representative node of a parent service network of a service network in which the new node 400 is to be newly registered.

In operations 46 and 47, the representative node 440 may search for the representative node of the parent service network, through the search process of the N-ary search tree.

In operation 48, a parent representative node 430 may store, as child registration information, the virtual address and the Internet address of the new node 400, and may transmit, to the new node 400, a message including a virtual address and an Internet address of the parent representative node 430.

The new node 400 may store information of the parent representative node 430 that is included in the message including a virtual address and an Internet address of the parent representative node 430. Additionally, the new node 400 may store the message including the virtual address and the Internet address of the parent representative node 430, and may be registered in a new service network. Accordingly, the new node 400 may be used as a representative node 460 of the new service network.

The new node 400 may transmit, to the directory server 410, a message including the Internet address of the new node 400. In other words, the new node 400 may transmit, to the directory server 410, information of the representative node 460 of the new service network.

Figure 5:
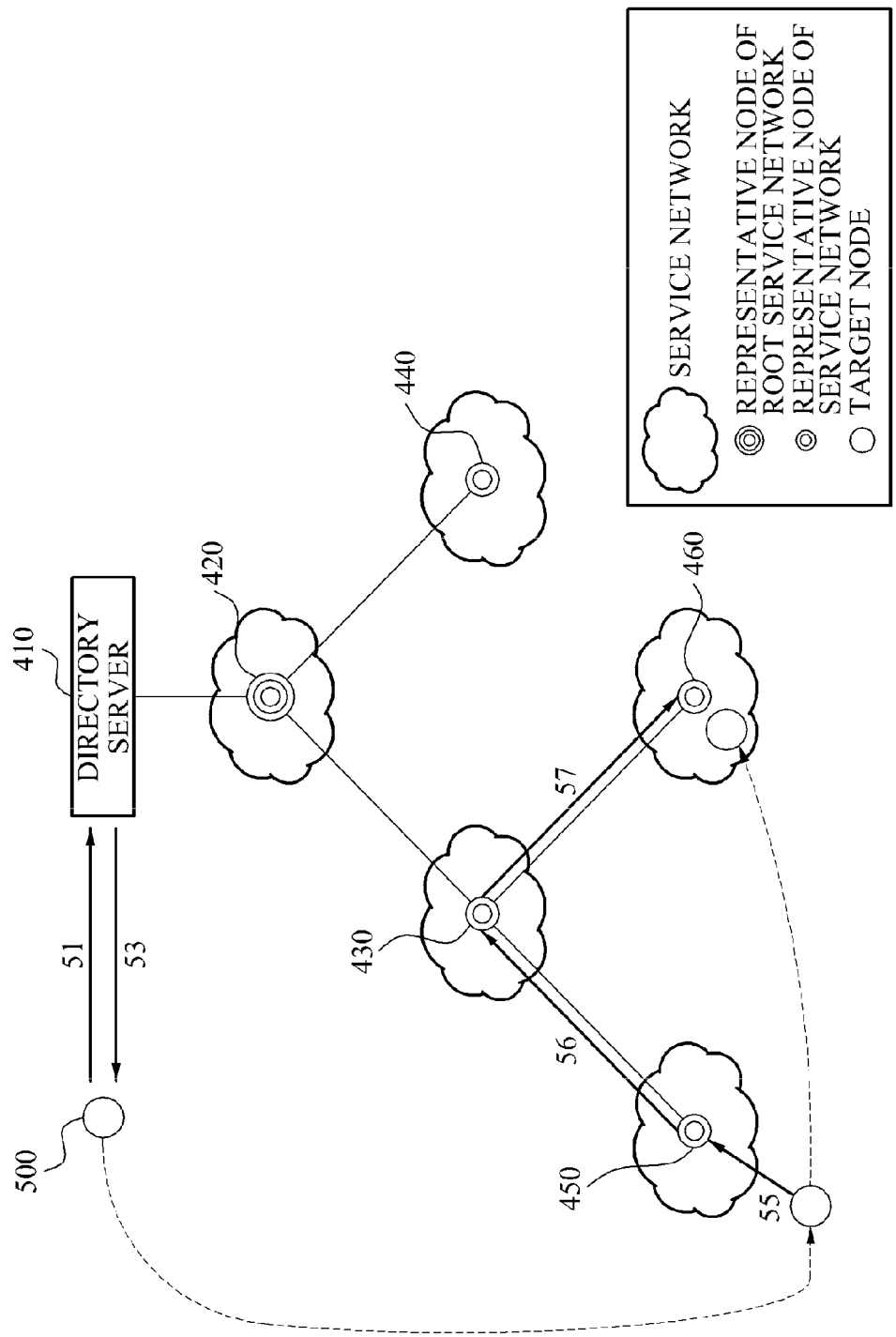
FIG. 5 is a diagram illustrating an example of registering a node in an existing service network, in a method of registering a service node according to an embodiment of the present invention.

FIG. 5 is a diagram illustrating an example of registering a node in an existing service network, in a method of registering a service node according to an embodiment of the present invention.

FIG. 5 illustrates another connection structure of a distributed network. While FIG. 4 illustrates an example of registering a new node that provides a new service, FIG. 5 illustrates an example of registering a node in an existing service network. In FIG. 5, a reference numeral 460 indicates a representative node of the existing service network. A node to be registered in the existing service network may be defined as a target node.

Referring to FIG. 5, in operation 55, a target node 500 may transmit a message including a virtual address of the existing service network, to a representative node 450 of a predetermined service network. Here, the target node 500 may transmit, to the directory server 410, a query including a name of a service to be provided by the target node 500. Specifically, the target node 500 may transmit the query, to determine whether information including a type, and the name of the service to be provided by the target node 500, and the like is stored and registered in the directory server 410.

The target node 500 may receive, from the directory server 410, a message in response to the query. Here, the message may include a service list, and an Internet address of the representative node 450, and the service list may include a virtual address of the existing service network. Accordingly, the target node 500 may acquire the virtual address of the existing service network, and information regarding the representative node 450.

The target node 500 may request the representative node 450 to search for a representative node 460 of the existing service network. The target node 500 may request the representative node 450 to search for a representative node of a parent service network of a service network in which the target node 500 is to be registered.

In operations 56 and 57, the representative node 450 may search for the representative node of the parent service network, through the search process of the N-ary search tree.

The target node 500 may be registered via the representative node 460 that is found as a result of operations 56 and 57. A method of registering the target node 500 in the representative node 460 may be defined based on the purpose during construction of a network. For example, when the representative node 460 is used as a representative node of a head network ring, the target node 500 may be registered in the head network ring, or a child ring. Here, an address range of each network ring may be used as references.

The representative node 460 may determine whether it is possible to register the target node 500 in a network ring to which the representative node 460 belongs, based on a node registration restriction condition. For example, the node registration restriction condition may include a restriction to a number of nodes that are able to be registered in the network ring, a restriction to a type of nodes, and the like. The restriction to the number of registerable nodes may ensure stability of a service network that supports an unstable mobile node.

When the target node 500 does not satisfy the node registration restriction condition, the representative node 460 may transfer a message including an ID of the target node 500 to a representative node of a child ring having an address range including the ID of the target node 500 among child rings. When a child ring exists even when the target node 500 is not registered in a single network ring, the target node 500 may transfer a search message to the representative node of the child ring, so that the target node 500 may be registered in the same service network as the child ring.

When the target node 500 is registered in the existing service network, the target node 500 may transmit, to the directory server 410, a message including a service address of a service network to which the target node 500 belongs, and an Internet address of the representative node 460. The directory server 410 may store the message received from the target node 500, as information of a representative node of a predetermined service network (for example, the representative node 450 of FIG. 5) that may be requested when a next registration of a target node is performed.

Figure 6:
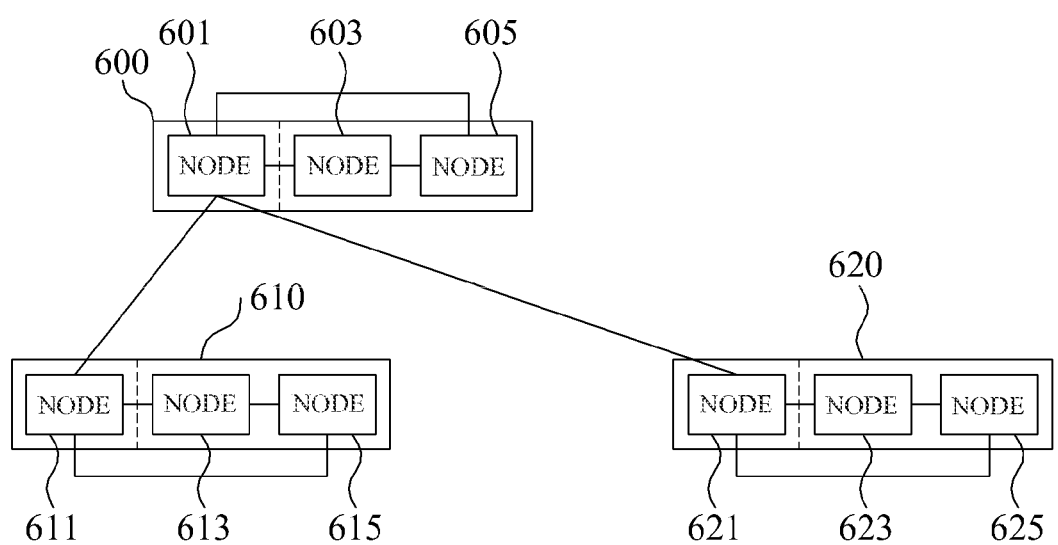
FIG. 6 is a diagram illustrating a network system according to an embodiment of the present invention.

FIG. 6 is a diagram illustrating a network system according to an embodiment of the present invention.

Referring to FIG. 6, the network system includes network rings 600, 610, and 620. The network ring may include at least one node. The network ring 600 may include nodes 601, 603, and 605, and the network ring 610 may include nodes 611, 613, and 615. Additionally, the network ring 620 may include nodes 621, 623, and 625. The nodes 601, 603, 605, 611, 613, 615, 621, 623, and 625 may be connected to each other, to form a ring shape. The network ring 600 may be defined as a parent ring of the network rings 610 and 620, and the network rings 610 and 620 may be defined as child rings of the network ring 600.

The network ring 600 as the parent ring may include a representative node 601, and member nodes 603 and 605. The representative node 601 may manage the network ring 600, and may perform signaling (namely, message exchange) with either a representative node of a parent ring or a representative node of each of the network rings 610 and 620 as the child rings, for example, in order to search for a floating IP address or to register a new node. Here, each representative node may be set based on a performance of a network, for example, a capacity, and a processing speed of a node. The member nodes 603 and 605 refer to nodes other than the representative node 601 in the network ring 600, and may request the representative node 601 to search for a floating IP address. When the representative node 601 is not operated, one of the member nodes 603 and 605 may be used as a new representative node, because the same information as information included in each representative node may be stored in a ring information table of each ring.

In the network system of FIG. 6, the nodes 601, 603, 605, 611, 613, 615, 621, 623, and 625 may periodically perform signaling with each other using a hello message, in order to monitor a state of each of the nodes. For example, when the node 601 sends a hello message to the node 603, but when the node 603 does not respond to the hello message, the node 603 may be eliminated from a ring information table, and the node 601 may send the hello message to the node 605, thereby notifying that the node 603 does not perform a function. Information regarding each network ring may be continuously updated while a hello message is signaled for each node. In other words, all nodes may continue to update ring information. Accordingly, even when a node does not perform any function, another node may be used instead of the node. However, a ring information table for a parent ring and child ring may be updated only through signaling between representative nodes. When a representative node receives a new ring information table, the node 601 may transfer the new ring information table to the node 603, and the node 603 may transfer the new ring information table to the node 605, so that all the nodes 601, 603, and 605 may update the updated ring information table for a parent ring and child ring.

Additionally, in the network system of FIG. 6, the representative node 601, 611, and 621 may search for a floating IP address of a target node based on an address range of each of the network rings 600, 610, and 620, for example an address range of '0' to '$2^N-1$', in the case of N bits. A representative node of a network ring may determine whether an ID of a target node is included in an address range of a parent ring or a child ring, and may perform signaling with a representative node of the parent ring or a representative node of the child ring. Accordingly, there is no need for all nodes to perform signaling to search for an IP address of the target node.

In other words, according to embodiments of the present invention, even when a node does not perform any function, another node may be used as the node based on a ring information table through a network ring, thereby ensuring a stability in a network including an unstable node such as a mobile node. Additionally, signaling may be performed between representative nodes, not between all nodes, thereby reducing a traffic load.

Therefore, a network system according to an embodiment of the present invention may access a local server, and may provide an extremely large number of services compared to a conventional system. Additionally, it is possible to search for an ID and a floating IP address of a target node and to perform remote control using a global ID, such as a sum of a national number and a mobile phone number, thereby developing a variety of contents without a broadcasting operation.

Furthermore, in the network system according to an embodiment of the present invention, a network ring may perform a search using only an address range including a maximum value and a minimum value that are determined based on an order of child rings in a tree hierarchy set in advance and accordingly, inserting or eliminating in a process of balancing the tree, and restoring may be simply performed. Since at least one node of each network ring may share data included in a representative node, the representative node may be easily restored even when the Internet is disconnected.

Figure 7:
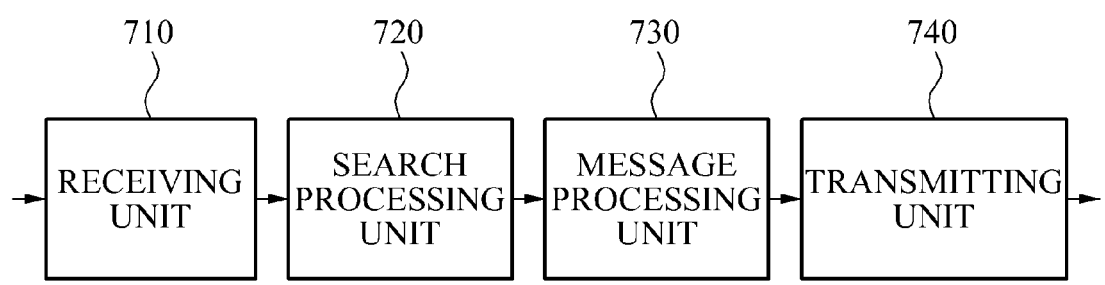
FIG. 7 is a block diagram illustrating an apparatus for searching for a floating IP address according to an embodiment of the present invention.

FIG. 7 is a block diagram illustrating an apparatus for searching for a floating IP address according to an embodiment of the present invention.

The apparatus of FIG. 7 includes a receiving unit 710, a search processing unit 720, a message processing unit 730, and a transmitting unit 740.

The receiving unit 710 may receive a first message including an ID of a target node. Here, the first message may include the ID of the target node that desires to search for a floating IP address, and a request for a search for the floating IP address.

Specifically, the receiving unit 710 may receive the first message from an external node that is not registered in a same service network as the target node, or from an internal node that is restored in the same service network as the target node.

The search processing unit 720 may determine whether the ID of the target node is registered in a network ring, based on a ring information table. For example, when the search processing unit 720 searches for the floating IP address of the target node from the external node, the first message may be transferred to a representative node of a service network, in particular, to a representative node of a head network ring. Accordingly, the search processing unit 720 may determine whether the ID of the target node is registered in the head network ring, based on a ring information table. Additionally, when searching for the floating IP address of the target node from the external node, when a floating IP of another target node is already searched for from the same service network, the search processing unit 720 may again search for the target node from the another target node.

When searching for the floating IP address of the target node from the internal node, the search processing unit 720 may determine whether the ID of the target node is in an address range of a network ring to which the internal node belongs. When the ID of the target node is in the address range of the network ring, the search processing unit 720 may determine whether the ID of the target node is registered in the network ring, based on a ring information table. Conversely, when the ID of the target node is not in the address range of the network ring, the search processing unit 720 may transfer the first message to a representative node of the network ring, in order to transfer the ID of the target node to a parent ring. When the ID of the target node is not registered in the network ring, the search processing unit 720 may also transfer the first message to the representative node of the network ring. The representative node may determine whether a child ring having an address range including the ID of the target node exists among child rings.

The message processing unit 730 may generate a second message, when the ID of the target node does not exist in the network ring. Specifically, the second message may be generated, when determining based on the ring information table that the ID of the target node is not registered in the network ring, regardless of whether the floating IP address of the target node is searched for from the external node or from the internal node. Here, the second message may include not only the ID of the target node, but also a search failure message that may be received from a head network ring and a leaf ring, information regarding whether a first network ring that starts the searching process is a parent ring or a child ring in a relationship with a second network ring that receives a message, and information regarding an order of the first network ring among child rings when the first network ring is a child ring.

The transmitting unit 740 may transmit the second message to a representative node of a parent ring and a representative node of a child ring having the address range of the target node. For example, when the search process is started from the head network ring, that is, when there is no parent ring, the transmitting unit 740 may transmit a search failure message to a source node, and may transmit the second message to the representative node of the child ring having the address range of the target node. When the search process is started from a network ring other than the head network ring, and when a search path is not overlapped, the transmitting unit 740 may transmit the second message to the representative node of the parent ring and the representative node of the child ring having the address range of the target node.

Figure 8:
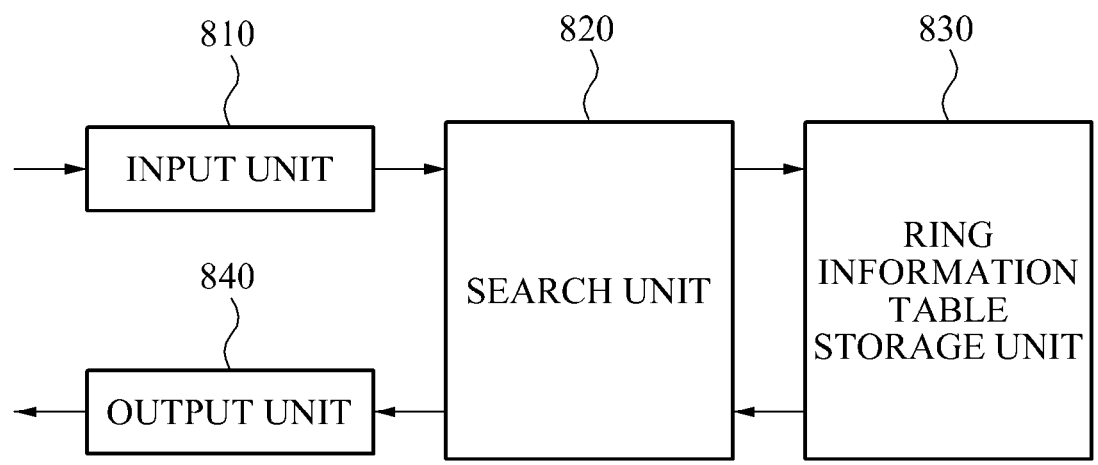
FIG. 8 is a block diagram of a node of a network ring, to explain a function of the node according to an embodiment of the present invention.

FIG. 8 is a block diagram of a node of a network ring, to explain a function of the node according to an embodiment of the present invention.

Referring to FIG. 8, the node includes an input unit 810, a search unit 820, a ring information table storage unit 830, and an output unit 840.

The input unit 810 may receive a signal from an internal node in the network ring, or from an external node. For example, the signal received by the input unit 810 may include a hello message signal used to monitor a state of the node, or a message signal used to identify an ID of a target node when searching for a floating IP address.

The search unit 820 may receive a signal from the input unit 810, and may search for information stored in the ring information table storage unit 830, in response to a request of the received signal. For example, the search unit 820 may search for information regarding which node is a representative node of a network ring, information regarding an address range of the network ring, information regarding an ID of a representative node of a parent ring or child ring, and the like. Additionally, when a portion of nodes forming a network ring does not perform their functions, and when a child ring or a parent ring is changed, the search unit 820 may update a ring information table.

The ring information table storage unit 830 may store information regarding the network ring in the form of a table. A variety of information may be stored in the ring information table, based on a use of a network, and may include, for example, IDs of nodes included in a network ring, an ID of a representative node included in a network ring, an IP address of each node, an address range of the network ring, and the like.

The output unit 840 may output the signal having the information found as a result of the searching by the search unit 820, to the internal node of the network ring or to the external node.

The method according to the embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of searching for a floating Internet Protocol (IP) address, the method comprising:
    receiving, by a node of a network ring, a first message from an external node, the first message comprising an IP address of the external node and an Identification (ID) of a target node;
    determining whether the ID of the target node is registered in the network ring, based on data from a ring information table;
    transferring the first message from the network ring to a representative node of a first child ring having an address range of the target node among child rings, when the ID of the target node is not registered in the network ring;
    transferring the first message from the network ring to a representative node of a parent having an address range of the target node among parent rings, when the ID of the target node is not registered in the network ring; and
    transferring the first message from the first child ring to a representative node of a second child ring having an address range of the target node among child rings, when the ID of the target node is not registered in the first child ring.

2. The method of claim 1, further comprising:
    searching for, by the external node, a service of the target node from a directory server, and receiving a virtual address of a service network of the target node; and
    transferring a second message to a representative node of a service network to which the external node belongs, the second message comprising the received virtual address.

3. A method of searching for a floating Internet Protocol (IP) address, the method comprising:
    receiving, by an internal node of a network ring, a message from an external node, the message comprising an IP address of the external node and an Identification (ID) of a target node;
    determining, by the internal node, whether an (ID) of the target node is in an address range of the network ring to which the internal node belongs;
    determining, based on a ring information table, whether the ID of the target node is registered in the network ring, when the ID of the target node is in the address range of the network ring;
    transferring the message to a representative node of the network ring, when the ID of the target node is not registered in the network ring, the message comprising the ID of the target node and the IP address of the external node;
    determining, by the representative node, whether a child ring having an address range comprising the ID of the target node exists among child rings;
    transferring the message to a representative node of a parent ring and a representative node of the child ring, when the child ring having the address range comprising the ID of the target node exists;
    determining, by the representative node of the parent ring, whether the ID of the target node is registered in the parent ring; and
    transferring the message to a representative node of a second parent ring when the ID of the target node is not registered in the parent ring.

4. The method of claim 3, further comprising:
    transferring the message to the representative node of the parent ring, when the ID of the target node is not in the address range of the network ring.

5. The method of claim 3, further comprising:
    transferring a search failure message to the internal node, when the ID of the target node is not registered in a head network ring, and when a child ring transferring the message to the head network ring is identical to the child ring having the address range comprising the ID of the target node, and when the ID of the target node is not registered in a leaf ring, the head networking ring being the parent ring, and the leaf ring being the child ring; and
    terminating the searching, when the search failure message is received from the head network ring and from the leaf ring.

6. A method of registering a service node, the method comprising:

requesting, by a new node, a directory server to transmit a service name of a service to be provided by the new node, and a virtual address of the new node;
transmitting a query to the directory server, the query comprising the service name of the service to be provided by the new node;
receiving the virtual address of the new node from the directory server;
transferring a first message to a representative node of a predetermined service network, and requesting a search for a parent representative node of the new node, the first message comprising the received virtual address of the new node;
searching, by the representative node of a predetermined service network, for the parent representative node of the new node by using a search process of a N-array search tree of the predetermined service network;
storing, by the parent representative node, the virtual address of the new node and an Internet address of the new node as child registration information, and transmitting a second message to the new node, the second message comprising a virtual address and an Internet address of the parent representative node;
storing, by the new node, information of the parent representative node, the information being comprised in the second message; and
receiving a third message from the directory server in response to the query, the third message comprising a service list and an Internet address of a representative node of a predetermined service network in a currently configured network.

7. The method of claim 6, wherein the storing of the information of the parent representative node comprises transmitting, to the directory server, a fourth message comprising the Internet address of the new node.

8. A method of registering a service node, the method comprising:
transmitting, by the service node, a first message to a representative node of a predetermined service network, the first message comprising a virtual address of an existing service network;
transmitting, by the service node, a query to a directory server the query comprising the service name of the service to be provided by service node;
receiving, by the service node, a second message from the directory server in response to the query, the second message comprising a service list and an Internet address of the representative node of the existing service network, where the service list includes a virtual address of the existing service network;
requesting, by the service node, the representative node of the predetermined service network to search for a representative node of the existing service network;
registering the service node through the representative node of the existing service network, the representative node of the existing service network being found as a result of the search,
wherein the registering of the service node comprises:
determining whether the service node is able to be registered in a network ring to which the representative node of the existing service network belongs, based on a node registration restriction condition; and
transferring, by the representative node of the existing service network, a third message to a representative node of a child ring having an address range comprising an Identification (ID) of the service node among child rings, when the service node does not satisfy the node registration restriction condition, the third message comprising the ID of the service node; and
transmitting, by the service node to the directory server, a fourth message including a service address of the existing service network to which the service node belongs and an Internet address of the representative node of the existing service network, when the service node is registered with the existing service network.

9. An apparatus for searching for a floating Internet Protocol (IP) address, the apparatus comprising:
a receiving unit configured to receive a first message from an external node, the first message comprising an IP address of the external node and an Identification (ID) of a target node;
a search processing unit configured to
determine whether the ID of the target node is registered in a network ring, based on data from a ring information table,
transfer the first message from the network ring to a representative node of a first child ring having an address range of the target node among child rings, when the ID of the target node is not registered in the first network ring,
transfer the first message from the network ring to a representative node of a parent network ring having an address range of the target node among parent rings, when the ID of the target node is not registered in the network ring, and
transfer the first message from the first child ring to a representative node of a second child ring having an address range of the target node among child rings, when the ID of the target node is not registered in the first child ring;
a message processing unit to generate a second message, when the ID of the target node is not registered in the network ring, the second message comprising a search failure message that may be received from a head network ring and a leaf ring in addition to the ID of the target node; and
a transmitting unit configured to transmit the second message to a representative node of a child ring having an address range of the target node among child rings.

10. An apparatus for searching for a floating Internet Protocol (IP) address, the apparatus comprising:
a receiving unit configured to receive a first message from an external node, the first message comprising an IP address of the external node and an Identification (ID) of a target node;
a search processing unit configured to
determine whether the ID of the target node is in an address range of a network ring to which an internal node belongs,
determine, based on a ring information table, whether the ID of the target node is registered in the network ring when the ID of the target node is in the address range of the network ring,
transfer the first message to a representative node of the network ring when the ID of the target node is not registered in the network ring,
determine, by the representative node, whether a child ring having an address range comprising the ID of the target node exists among child rings,
transfer the first message to a representative node of a parent ring and a representative node of the child ring, when the child ring having the address range comprising the ID of the target node exists, determine, by the representative node of the parent ring, whether the ID of the target node is registered in the parent ring, and transfer the message to a representative node of a second parent ring when the ID of the target node is not registered in the parent ring;

a message processing unit configured to generate a second message, when the child ring having the address range comprising the ID of the target node exists, the second message comprising a search failure message that may be received from a head network ring and a leaf ring in addition to the ID of the target node; and a transmitting unit configured to transmit the second message to a representative node of a parent ring and a representative node of the child ring having the address range.

11. A network system for searching for a floating Internet Protocol (IP) address, the network system comprising:

a first representative node included in a first network ring to perform signaling with either a second representative node of a parent ring or a third representative node of a child ring, for searching for a floating IP address; and at least one member node, located in the first network ring of the first representative node, to request the first representative node to search for a floating IP address of a predetermined node, when a search for the floating IP address of the predetermined node is required, wherein the member node of the first network ring can be used as a new representative node, when the first representative node is not operating, and wherein the first representative node of the first network ring and member nodes of the parent ring and child ring periodically monitor a state of each node in the rings by using a hello message.

12. The network system of claim 11, wherein the first representative node searches for a floating IP address of a target node using an address range of a network ring.

* * * * *